UNITED STATES PATENT OFFICE.

PHILIPPINA PRASS AND LOUIS PRASS, OF NEW YORK, N. Y.

IMPROVEMENT IN MEDICAL COMPOUNDS OR HAIR-RESTORATIVES.

Specification forming part of Letters Patent No. 148,139, dated March 3, 1874; application filed January 10, 1874.

*To all whom it may concern:*

Be it known that we, PHILIPPINA PRASS and LOUIS PRASS, of the city, county, and State of New York, have invented a new and Improved Hair-Restorative, of which the following is a specification:

The object of our invention is to furnish to the public an improved compound for restoring the hair, which compound exerts a tonic and healthy influence upon the hair, softens the skin, and strengthens the roots of the hair, so that a more vigorous growth of the same is produced.

Our invention consists of a decoction of equal quantities of plantain and tansy, which is thoroughly mixed with glycerine, alcohol, and some odoriferous oil, in the following manner and proportions, to wit: Equal quantities of plantain and tansy are boiled in water till the bitter part of these herbs is extracted and a strong decoction of the same obtained. This decoction is strained and six parts thereof thoroughly mixed with one part of glycerine and one part of alcohol. Some drops of oil of bergamot or other odoriferous oil are then added to give the necessary fragrance, the glycerine serving to soften the skin and penetrate the pores, the decoction of the bitter herbs to invigorate the hair and produce a healthy and stimulating effect thereon.

Having thus described our invention, we claim as new, and desire to secure by Letters Patent—

A hair-restorative consisting of a decoction of plantain and tansy, and glycerine or alcohol, compounded in about the proportions herein specified.

PHILIPPINA PRASS.
LOUIS PRASS.

Witnesses:
T. B. MOSHER,
SOLON C. KEMON.